United States Patent Office 3,767,775
Patented Oct. 23, 1973

3,767,775
PROCESS FOR PRODUCING CALCIUM
HYPOCHLORITE
Seiji Tatara, Tokyo, Yasuo Morita, Yoshiki Doomori,
and Masasi Kumoda, Niigata-ken, Yoshikazu Iwaki,
Takada, and Teruyuki Fujishima, Niigata-ken, Japan,
assignors to Nippon Soda Co., Ltd., Tokyo, Japan
No Drawing. Filed Nov. 18, 1971, Ser. No. 200,226
Claims priority, application Japan, Nov. 20, 1970,
45/101,927; Nov. 24, 1970, 45/102,720
Int. Cl. C01b 11/00; C01d 3/04; C01f 11/00
U.S. Cl. 423—474    5 Claims

ABSTRACT OF THE DISCLOSURE

Equal weight parts of sodium hydroxide, calcium hydroxide and water are added to mother liquor which is already pregnant with sodium chloride and calcium hypochlorite. Chlorine gas is introduced into this mixture under agitation. This will produce small size crystals of calcium hypochlorite and large size crystals of sodium chloride which can then be readily separated because of this size difference.

BACKGROUND OF THE INVENTION

This invention relates to producing calcium hypochlorite, and more particularly, is concerned with producing high test calcium hypochlorite in a one-step chlorination process without producing bleaching liquor as a by-product.

BRIEF DESCRIPTION OF THE PRIOR ART

It has long been known that high test calcium hypochlorite can be produced by chlorinating a mixture of calcium hydroxide (slaked lime) and caustic soda with chlorine gas so as to produce crystals of sodium chloride and calcium hydroxide. However, it is very difficult to isolate crystals of calcium hypochlorite from this production mixture in which crystals of sodium chloride and crystals of calcium hypochlorite co-exists. Methods to readily carry out this isolating of the calcium hypochlorite have been reported in literature. In Japanese patent publication No. 25,143/1968 a two-step chlorination is reported. In a first step, sodium hydroxide is chlorinated with chlorine gas, and a reaction mixture solution containing sodium hypochlorite and crystals of sodium chloride is produced according to Formula I:

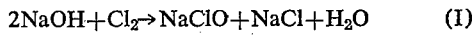

$$2NaOH + Cl_2 \rightarrow NaClO + NaCl + H_2O \quad (I)$$

Then the sodium chloride is isolated from the mixture solution so that in the second step, milk calcium hydroxide is added in the mixture solution and the mixture solution is chlorinated by using chlorine gas to produce calcium hypochlorite and the crystals of calcium hypochlorite are isolated according to Formula II:

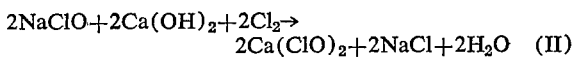

$$2NaClO + 2Ca(OH)_2 + 2Cl_2 \rightarrow$$
$$2Ca(ClO)_2 + 2NaCl + 2H_2O \quad (II)$$

However, in such a two-step chlorination method, not only is the operation complicated, but also a lot of bleaching mother liquor is produced as a by-product and the yield of calcium hypochlorite based on chlorine used is lowered because calcium hypochlorite is lost in the bleaching mother liquor and disposal of the bleaching mother liquor causes water pollution of rivers or sea.

According to U.S. Pat. No. 1,718,284, a diluted calcium hydroxide and sodium hydroxide solution is chlorinated and only crystals of sodium chloride are isolated from the solution. Then seeds of crystals of calcium hypotchlorite are fed into the solution and crystals of calcium hypochlorite, which have grown into large crystals, are isolated. However, the growth of crystals of calcium hypochlorite is not sufficient to easily carry out the isolation, and supersaturation of calcium hypochlorite is sometimes broken before the isolation of the crystals of sodium chloride is completed and an inseparable crystal mixture of sodium chloride and calcium hypochlorite is formed.

Furthermore, in U.S. Pat. No. 3,251,647 and in Japanese patent publication No. 19,885/1966, a method in which calcium hydroxide and caustic soda are chlorinated in a diluted state in water and crystals of calcium hypochlorite are grown by concentrating the aqueous solution at a temperature less than 30° C. under reduced pressure, is reported. The main disadvantage of this method is that the evaporation should be carried out at a temperature of less than 30° C. because decomposition of calcium hypochlorite begins at about 30° C.

The present inventors have found that when a specified mixture of calcium hydroxide, caustic soda, water and bleaching mother liquor is chlorinated by chlorine gas under certain conditions, crystals of sodium chloride become large and crystals of calcium hypochlorite having good dehydration properties are obtained without any by-production of bleaching liquor.

OBJECTS OF THE INVENTION

Accordingly, it is an object of this invention to provide a method for producing calcium hypochlorite in a one-step chlorination process.

It is another object of this invention to provide a method for producing high test calcium hypochlorite in a one-step chlorination process without producing bleaching liquor as a by-product.

It is another object of this invention to provide a method for producing high test hypochlorite in a high yield of chlorine.

It is still another object of this invention to provide a method in which the crystals of sodium chloride and the calcium hypochlorite crystals have a different particle size distribution so that the crystals can be easily separated from each other.

SUMMARY OF THE INVENTION

Broadly stated, according to the inventive concept, about equal weight parts of sodium hydroxide, calcium hydroxide and water are added to mother liquor which is already pregnant with sodium chloride and calcium hypochlorite. Chlorine gas is introduced into this mixture under agitation. This will produce small size crystals of calcium hypochlorite and large size crystals of sodium chloride which can then be readily separated because of this size difference.

Other objects and advantages of this invention will become apparent hereinafter from the following detailed description.

DETAILED DESCRIPTION

In the invention a mixture of raw material is prepared by adding about 1 weight part of sodium hydroxide, about 0.93 to about 1.02 weight part of calcium hydroxide into about 13 to about 20 weight parts of mother liquor obtained in a later step, and then the slurry mixture of raw material is chlorinated by introducing chlorine gas to chlorinate about 93% to about 99%, preferably 95% to 98% of the total alkali contents in the mixture during agitation and sodium chloride crystal, calcium hypochlorite crystal and mother liquor, which comprise the reaction mixture, are respectively isolated and then the mother liquor separated from the reaction mitxure is recycled back as a diluent of the raw material.

In the reaction mixture, calcium hypochlorite crystals having a main particle size distribution of 20 to 90μ and sodium chloride crystals having a main particle size distribution of 100 to 300μ are formed, and these crystals and the mother liquor can be respectively isolated from each other. As for the methods of separation of these crystals and mother liquor, various known separation methods can be employed, but hydrocyclone, sifter or classifier of upper flow type are preferably employed.

For example, the reaction mixture containing crystals is introduced into a hydrocyclone and mother liquor containing calcium hypochlorite crystals is flowed over and mother liquor containing sodium chloride crystals is flowed under. Further, the mother liquor containing calcium hypochlorite crystals obtained by the overflow from the cyclone is decanted, and a first mother liquor (A) and a concentrated slurry of calcium hypochlorite crystals are obtained. The concentrated slurry is further centrifuged and wet crystals of calcium hypochlorite containing about 32% of water from the mother liquor and a second mother liquor (B) is obtained.

If desired, the wet calcium hypochlorite is dried in dry air at about 100° C. to about 140° C. While the mother liquor containing sodium chloride crystal flowed under from the cyclone is sieved with mother liquor (A and/or B) obtained in the aforesaid separation, in order to recover fine calcium hypochlorite crystals contaminated by sodium chloride crystals, the sodium chloride crystals on a sieve are further centrifuged after diluting by mother liquor and wet sodium chloride crystals containing about 3% to about 6% of water are obtained, and mother liquor containing fine crystals of calcium hypochlorite is obtained through the sieve openings. The mother liquor obtained in the separation is collected and recycled back as a diluent.

When a classifier of the upper flow type is employed for isolation of sodium chloride crystals, calcium hypochlorite and mother liquor, the reaction mixture is flowed upward in the state of piston flow through a cylindrical classifier at a rate of 0.03 to 0.3 cm./sec.

Sodium chloride crystals settle countercurrently into the bottom of the classifier and calcium hypochlorite overflows with mother liquor. The sodium chloride crystals settled at the bottom of the classifier are taken out as a slurry, centrifuged and separated from the mother liquor, while calcium hypochlorite crystals are overflowed with mother liquor and calcium hypochlorite crystals are isolated from the mother liquor by centrifugal separation. The mother liquor obtained in the separation is collected and recycled into the preparation of the mixture of raw material.

For the preparation of a mixture of raw materal, 50° Baumé sodium hydroxide or solid sodium hydroxide and water can be employed as the components of sodium hydroxide and water, and powder of slaked lime having a particle size less than 200μ, preferably about 1μ to about 100μ, containing less than 2% of calcium carbonate can be employed. Water may be added with sodium hydroxide or slaked lime.

The order of addition of sodium hydroxide, calcium hydroxide, into the mother liquor does not matter, but preferably after addition of sodium hydroxide under agitation, calcium hydroxide is introduced into the mother liquor in order to make the mixture a homogeneous slurry and to avoid forming blocks of a double salt of $CaO(ClO)_2$ and $Ca(OH)_2$.

When blocks of a double salt larger than about 100μ are unfortunately formed, such blocks are preferably grained in particles of less than 100μ.

Chlorination of sodium hydroxide and calcium hydroxide proceeds according to the following equations:

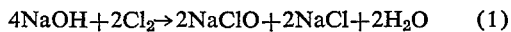
$$4NaOH + 2Cl_2 \rightarrow 2NaClO + 2NaCl + 2H_2O \quad (1)$$

$$2Ca(OH)_2 + 2Cl_2 \rightarrow Ca(ClO)_2 + CaCl_2 + 2H_2O \quad (2)$$

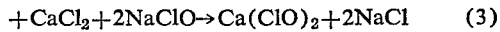
$$+ CaCl_2 + 2NaClO \rightarrow Ca(ClO)_2 + 2NaCl \quad (3)$$

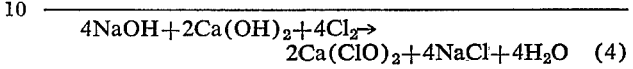
$$4NaOH + 2Ca(OH)_2 + 4Cl_2 \rightarrow$$
$$2Ca(ClO)_2 + 4NaCl + 4H_2O \quad (4)$$

and the chlorination should be stopped at the point when 99% of the total alkali content of sodium hydroxide and calcium hydroxide in the mixture is chlorinated, in order to maintain the reaction mixture on the alkali side and to avoid decomposition of produced $Ca(OCl)_2$.

The feeding rate of chlorine gas for the chlorination is preferably maintained as fast as possible and when chlorine is fed for about 0.5 to about 4.0 hours crystals of sodium chloride grow up to large particles.

The temperature of the reaction mixture during the chlorination should be kept at 15° C. to 25° C. by employing cooling means, because a temperature lower than 15° C. causes formation of a triple salt of sodium chloride, sodium hypochlorite and calcium hypochlorite $(Ca(OCl)_2 \cdot NaOCl \cdot NaCl \cdot 12H_2O)$ and a temperature of more than 25° C. causes decomposition of the calcium hypochlorite.

For the starting up of the method of the invention, an aqueous solution saturated with sodium chloride and calcium hypochlorite may be used as the recycling mother liquor.

In the invention a mixture of raw material is so prepared that available chlorine content in the reaction mixture may be about 14.5% to about 16.5% after the completion of the chlorination and only when the available chlorine is in this range will the sodium chloride crystals and calcium hypochlorite crystals grow up to be large particles having sufficient thickness to be well separable from the mother liqour. When the available chlorine content is more than 16.5%, small sodium chloride crystals form in the reaction mixture and when the content is less than 14.5%, both the sodium chloride crystals and calcium hypochlorite crystals do not grow to be large particles and it becomes difficult to separate crystals from the water and isolate them from each other.

In this invention all of the mother liquor isolated from the reaction mixture can be recycled as a diluent without being taken out of the reaction system. However, when the mother liquor is required as a bleaching liquor, an excess amount of mother liquor can be produced by employing water of the upper range of 0.9 to 1.1 weight parts in a mixture of raw material and recycling mother liquor of a lower range of 13 to 20 parts by weight to the mixture of raw materials.

EXAMPLE I 2.0 tons of 50% sodium hydroxide solution was added to 18.3 tons of a solution containing 9.9% of $Ca(OCl)_2$ and 19.7% of NaCl having the same composition as the mother liquor. After vigorous agitation, 1.0 ton of fine powder of 95% slaked lime under 100 meshes (Tyler) was mixed with the above solution. Then, 1.7 tons of chlorine gas was introduced to the above mixing solution for 1.85 hours at 18 to 22° C. under agitation, after finely crushing, formed fine blocks comprised mainly of a double salt of calcium hypochlorite and calcium hydroxide. 230 tons of obtained chlorinated solution containing the crystallized calcium hypochlorite and sodium chloride was passed upward through a classifier of the upper flow type having a diameter of 1.5 m. and a height of 1.2 m. with a piston flow at the rate of 0.1 cm. per second. Thus, 2.9 tons of slurry (A) containing sodium chloride crystals as a main component in a solid phase from the bottom of classifier and 20.0 tons of slurry containing calcium hypochlorite crystals as a main component in a solid phase from the upper part of the classifier were obtained. This 20.0 tons of slurry containing calcium hypochlorite crystals was concentrated to 30% to 35% of slurry concentration by a super decanter (Sharpless Super Decanter, Type P-3000), then 2.9 tons of the wet crystal of calcium hypochlorite ($Ca(OCl)_2$ 54.5%, NaCl 6.4%) and 16.8 tons of mother liquor ($Ca(OCl)_2$ 9.6%, NaCl 19.6%) were separated from the above concentrated slurry by the centrifuge. High test bleaching power containing 75% as available chlorine was obtained from the above wet crystals by drying.

On the other hand, 2.9 tons of slurry of sodium chloride crystals contained a small quantity of calcium hypochlorite crystals, so, 4.5 tons of mother liquor obtained in the separation step of the wet calcium hypochlorite crystals was added into this sodium chloride slurry and after agitating for suspension, the mixture was passed through into the classifier of the upper flow type having a diameter of 0.42 m. and a height of 1.2 m. at the rate of 0.42 cm. per second by piston flow. Thus, 2.1 tons of sodium chloride slurry (B), and 5.2 tons of overflow solution ($Ca(OCl)_2$ 10.6%, NaCl 19.9%) containing a small quantity of calcium hypochlorite and sodium chloride crystals were obtained. 1.25 tons of the sodium chloride crystals (NaCl 92.8%, $Ca(OCl)_2$ 1.0%) and 0.8 ton of mother liquor ($Ca(OCl)_2$ 9.6%, NaCl 19.6%) were obtained. 18.3 tons of total mother liquor ($Ca(OCl)_2$ 9.9%, NaCl 19.7%) obtained by mixing 12.3 tons of the mother liquor separated from calcium hypochlorite slurry, 5.2 tons of overflow solution classified from the mixture of sodium chloride slurry (A) and the mother liquor, and 0.8 ton of mother liquor separated from sodium chloride slurry (B) were wholly recycled to the first step and the foregoing process could be repeated.

The particle size distribution of wet calcium hypochlorite crystals and sodium chloride crystals obtained in this invention were as follows:

Particle size distribution of calcium hypochlorite

| Particle size ($\mu$): | Distribution (percent) |
| --- | --- |
| Under 20 | 5.2 |
| 20–40 | 20.7 |
| 40–60 | 35.5 |
| 60–80 | 25.8 |
| 80–90 | 10.8 |
| Over 90 | 2.0 |

Particle size distribution of sodium chloride

| Particle size ($\mu$): | Distribution (percent) |
| --- | --- |
| Under 100 | 3.0 |
| 100–140 | 13.4 |
| 140–180 | 29.2 |
| 180–220 | 31.6 |
| 220–260 | 14.1 |
| 260–300 | 7.3 |
| Over 300 | 1.4 |

EXAMPLE II 1.03 tons of solid caustic soda was dissolved into 18.3 tons of the solution containing 9.8% of $Ca(ClO)_2$ and 19.8% of NaCl having the same composition as the mother liquor at a temperature of less than 35° C. under slow agitation and after mixing, 1.0 ton of the fine powder of 95% slaked lime and 1.51 tons of water was mixed with this mixture. 1.7 tons of chlorine gas was introduced into this mixture for 1.0 hour at 20 to 24° C.

23.5 tons of obtained chlorinated solution containing the crystallized calcium hypochlorite and sodium chloride was introduced into the hydrocyclone having a diameter of 0.125 m., a height of 0.5 m., feed nozzle of 25 mm., an overflow nozzle of 25 mm. and an underflow nozzle of 10 mm. at a rate of 13 to 20 tons per hour. Thus, 2.5 tons of underflow slurry (A) containing sodium chloride crystal as a main component in the solid phase and 20.9 tons of overflow slurry containing calcium hypochlorite crystal as a main component in the solid phase were obtained. This overflow slurry was concentrated to 30 to 35% based on the weight of solid calcium hypochlorite by the decanter (Sharpless Super Decanter P-3000). Then, 2.7 tons of the wet crystal of calcium hypochlorite ($Ca(OCl)_2$ 55.7%, NaCl 6.0%) and 18.0 tons of mother liquor ($Ca(OCl)_2$ 9.5%, NaCl 19.7%) were obtained by centrifuging the above concentrated slurry. Thus, high test bleaching powder containing 76% as available chlorine was obtained from the above wet crystal by drying.

On the other hand, 4.5 tons of mother liquor obtained by centrifuging the overflow slurry was added to the underflow slurry (A) and after a vigorous agitation for suspension, this mixed slurry was sieved by a vibrating sifter having a diameter of 0.8 m. and a sieve of 80 mesh at a rate of 5 to 6 tons per hour. Thus, 1.5 tons of concentrated sodium chloride slurry (B) and 5.4 tons of suspension ($Ca(ClO)_2$ 10.5%, NaCl 19.8%) containing a little amount of the crystals of calcium hypochlorite and sodium chloride were obtained. 1 ton of mother liquor obtained by centrifuging the overflow slurry was added into this slurry (B) and agitated. Then, this mixture was centrifuged and 1.5 tons of sodium chloride crystals (NaCl 94.0%, $Ca(OCl)_2$ 0.72%) and 1.3 tons of mother liquor ($Ca(OCl)_2$ 9.8%, NaCl 19.7%) were obtained.

19.2 tons of mother liquor was obtained as the total amount. 18.3 tons of mother liquor obtained plus 5.4 tons of suspension from sifter, 1.3 tons of mother liquor obtained by separating the sodium chloride crystal and 11.6 tons of mother liquor obtained by separating the wet calcium hypochlorite crystal were gathered and recycled to the first step and the above described process could be repeated.

Moreover, 0.9 ton of surplus mother liquor separated from wet calcium hypochlorite crystal was taken out from the reaction system.

What is claimed is:

1. A process for producing a high test calcium hypochlorite comprising:
    (a) preparing a mixture by adding 1 weight part of sodium hydroxide, about 0.93 to about 1.02 weight parts of calcium hydroxide and about 0.9 to about 1.1 weight parts of water into about 13 to about 20 weight parts of mother liquor pregnant with sodium chloride and calcium hypochlorite;
    (b) chlorinating about 93% to about 99% of the total alkali contents in the mixture by introducing chlorine gas under agitation into said mixture while maintaining the temperature of the mixture between 15° C. and 25° C. to produce small size crystals of calcium hypochlorite consisting principally of particle sizes finer than about 90$\mu$ and large size crystals of sodium chloride consisting principally of particle sizes coarser than about 100$\mu$;
    (c) separating the crystals of sodium chloride, the crystals of calcium hypochlorite and the mother liquor respectively; and
    (d) recycling back the mother liquor obtained in the step (c) to step (a) as the new pregnant liquor.

2. A process according to claim 1, wherein chlorination is carried out for about 0.5 to about 4 hours.

3. A process according to claim 1, wherein chlorination is carried out for about 1.0 to about 2 hours.

4. A process according to claim 1, wherein slaked lime having a particle size of under 100 mesh (Tyler) is used as the calcium hydroxide.

5. A process according to claim 1, wherein at first sodium hydroxide and water are added to the mother liquor and then slaked lime is added to the mother liquor as the first step.

References Cited

UNITED STATES PATENTS

| | | | |
|---|---|---|---|
| 1,713,669 | 5/1929 | MacMullin et al. | 423—474 |
| 1,718,284 | 6/1929 | George et al. | 423—474 |
| 1,718,285 | 6/1929 | George | 423—474 |
| 1,754,473 | 4/1930 | MacMullin et al. | 423—474 |
| 3,251,647 | 5/1966 | Nicolaisen | 423—474 |
| 3,572,989 | 3/1971 | Tatara et al. | 423—474 |

EDWARD STERN, Primary Examiner

U.S. Cl. X.R.

252—187 H; 423—499